Feb. 26, 1957    W. RODENACKER    2,782,843
APPARATUS FOR CONTINUOUS REMOVAL OF
VOLATILE MATERIALS FROM LIQUIDS
Filed March 2, 1953
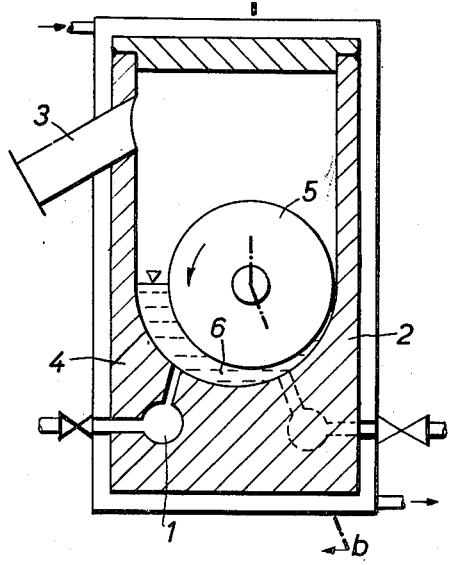
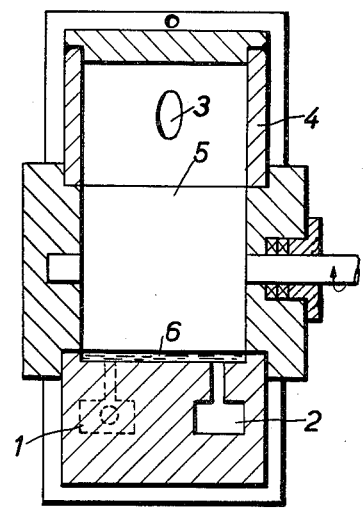
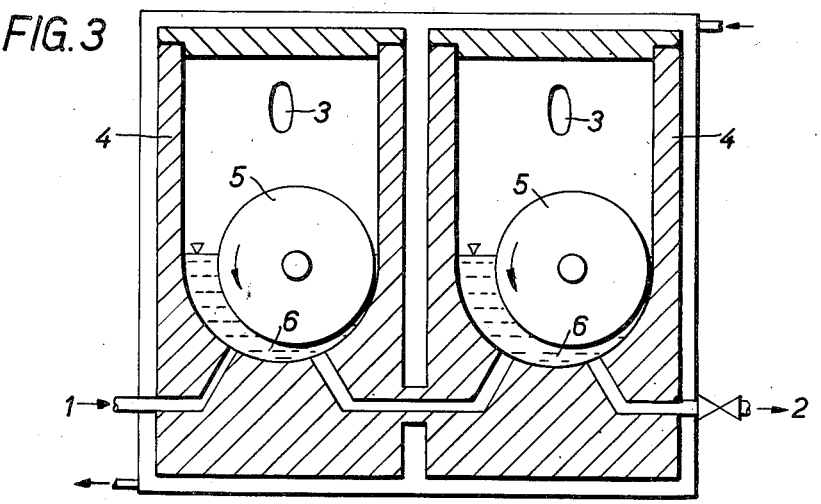
INVENTOR.
WOLF RODENACKER
BY Burgess and Dinklage
ATTORNEYS

United States Patent Office 2,782,843
Patented Feb. 26, 1957

2,782,843

APPARATUS FOR CONTINUOUS REMOVAL OF VOLATILE MATERIALS FROM LIQUIDS

Wolf Rodenacker, Dormagen, Germany, assignor to Farbenfabriken Bayer Aktiengesellschaft, Leverkusen, Germany, a corporation of Germany Application March 2, 1953, Serial No. 339,873

Claims priority, application Germany March 3, 1952

3 Claims. (Cl. 159—11)

The present invention relates to a new apparatus for the continuous removal of volatile materials from liquids by the evaporation of thin layers of liquids.

It is known to remove volatile materials from liquids by evaporation of thin layers by forming a thin layer of liquid on a rotating roll. To carry out the continuous removal of volatile materials from liquids a number of conditions must prevail apart from the formation of the largest possible surface. Provisions must be made for the uniform passage of the liquid through the evaporation chamber. Such quantity of liquid is allowed to enter the evaporation chamber as is required to maintain a uniformly high liquid level. When the operation is performed in vacuo it is further necessary to remove the liquid from the evaporation vessel continuously by the application of a certain pressure.

In accordance with the present invention I have found that it is possible to control the feed quantity, to form the thin layer of liquid, to distribute the liquid in this layer and to take off the liquid under pressure from the evaporation chamber and to overcome the difficulties associated with the continuous removal of volatile materials by causing the thin layer of liquid to form on a roll which forms a clearance with the casing.

An apparatus according to the invention is shown by way of example in the accompanying drawing in which Fig. 1 is a sectional view of the apparatus.

Fig. 2 is a horizontal section through the apparatus showing the shape of the roller 5.

Fig. 3 is a sectional view of two apparatus of Fig. 1 arranged in series.

Referring to Fig. 1, the roll 5 is eccentrically arranged in the casing 4 which is provided with the feed duct 1 and the discharge duct 2. The roll 5 forms a crescent-shaped clearance 6 with the casing 4. The gas outlet pipe 3 is arranged to take off the volatile material. The pressure in the feed duct 1 through which the liquid enters the evaporation vessel is kept constant. By rotating the roll 5 the liquid is drawn into the wedge-shaped clearance 6 so as to produce a counter-pressure in the feed duct, said counter-pressure allowing the inflow of liquid up to a definite rate. When the pressure in the clearance 6 at the inlet increases up to the value of the constant pressure in the feed duct 1 no further quantities of liquid enter the clearance. In this manner the liquid is kept at a constant level.

The pressure increases in the direction of rotation of the roll so that the liquid is forced out at the outlet 2. The duct 2 is narrower than the feed duct 1 or is provided with a throttle or conveys into a measuring pump, for instance a gear pump. The motion of the roll results in the formation of a continuously renewing thin layer of the liquid material on the free surface of the roll. The feed duct for the liquid is arranged at the wider part of the crescent-shaped clearance, the discharge duct at the narrower part of the clearance. The clearance is formed by the roll and the casing which surrounds the roll. The hydraulic pressure in the clearance is compensated so that the liquid is taken from the inlet to the outlet and a uniform formation of the thin layer is produced. This is the reason why the known slides for transverse conveyance of the liquid along the roll can be dispensed with, which simplifies the apparatus considerably. The apparatus according to the invention is particularly suitable for continuously evaporating volatile ingredients from liquids in vacuo.

It may be expedient to carry out the evaporation of the volatile ingredients in several steps and to apply different pressures and temperatures for each step. For this purpose a number of evaporation chambers in which the rolls are appropriately equipped can be arranged in series (as shown in Fig. 3). The single steps can either be jointly heated or each step is heated to a different temperature. Furthermore, the pressures applied in the single evaporation chambers may be different. In spite of the series-arranged two or more apparatus no special measures are required on the passages of the liquid from one apparatus to the other. Each preceding apparatus serves as means producing a constant pressure for the series-arranged steps and each series-arranged roll at the outlet side as means producing counter-pressure to control the rate of inflow from the preceding apparatus.

The apparatus according to the invention can advantageously be used for instance for the evaporation of liquids, the degasification of liquids in the synthetic fiber industry, the removal of monomeric constituents from fusible polymers or polycondensation products and the concentration of juices or milk. Furthermore, the apparatus may be adapted to remove solvent residues in the oil industry and related industries. By mounting cooling surfaces high vacuum distillations can be performed.

I claim:

1. An apparatus for the continuous removal of volatile materials from liquids, which comprises a casing defining a substantially enclosed evaporating chamber having an inner wall at least a portion of which is curved, a cylindrical roll eccentrically positioned in said chamber to form a crescent-shaped clearance with the curved portion of the inner wall thereof, means defining a liquid inlet into the wider portion of said clearance, means defining a liquid outlet out of the narrower portion of said clearance, means for rotating said cylindrical roll, and vapor outlet means positioned in said chamber for the removal of vapors therefrom.

2. An apparatus according to claim 1 which includes at least two of said chambers arranged in series, the liquid outlet of each prior preceding chamber being connected to the liquid inlet of the next succeeding chamber.

3. An apparatus according to claim 1 in which said cylindrical roll and said curved portion of the inner wall are positioned in the bottom portion of said chamber, said vapor outlet means are positioned in the upper portion of said chamber.

References Cited in the file of this patent

UNITED STATES PATENTS

| | | |
|---|---|---|
| 642,620 | Mather | Feb. 6, 1900 |
| 1,769,176 | Collins et al. | July 1, 1930 |
| 2,047,759 | Wingert | July 14, 1936 |
| 2,291,046 | Lange | July 28, 1942 |
| 2,581,081 | Vout | Jan. 1, 1952 |

FOREIGN PATENTS

| | | |
|---|---|---|
| 720,485 | Germany | May 7, 1942 |